United States Patent
Ogawa

(10) Patent No.: US 7,138,910 B2
(45) Date of Patent: Nov. 21, 2006

(54) TIRE/WHEEL ASSEMBLY ABNORMALITY DETERMINING APPARATUS AND METHOD

(75) Inventor: Atsushi Ogawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 153 days.

(21) Appl. No.: 10/844,427

(22) Filed: May 13, 2004

(65) Prior Publication Data

US 2004/0246115 A1    Dec. 9, 2004

(30) Foreign Application Priority Data

May 23, 2003    (JP) ............................. 2003-146208

(51) Int. Cl.
*B60Q 23/00* (2006.01)

(52) U.S. Cl. ...................... 340/442; 340/443; 340/445; 340/447; 340/657; 340/658; 73/146

(58) Field of Classification Search ................ 340/442, 340/443, 445, 447, 657, 658; 73/146, 146.2, 73/146.3, 146.5
See application file for complete search history.

(56) References Cited

U.S. PATENT DOCUMENTS

| | | | | |
|---|---|---|---|---|
| 4,694,273 A | * | 9/1987 | Franchino | ................... 340/447 |
| 5,553,491 A | * | 9/1996 | Naito et al. | ................. 73/146.5 |
| 6,668,637 B1 | * | 12/2003 | Ono et al. | .................. 73/146.5 |
| 2003/0006893 A1 | | 1/2003 | Dunbridge et al. | |

FOREIGN PATENT DOCUMENTS

| | | |
|---|---|---|
| EP | 1 026 016 A2 | 8/2000 |
| JP | A 6-211012 | 8/1994 |
| JP | A 8-132831 | 5/1996 |
| WO | WO 01/12453 A1 | 2/2001 |

* cited by examiner

*Primary Examiner*—Julie Bichngoc Lieu
(74) *Attorney, Agent, or Firm*—Oliff & Berridge, PLC

(57) ABSTRACT

A tire/wheel assembly abnormality determining apparatus and a method thereof determines whether there is an abnormality in a tire/wheel assembly in a vehicle provided with the tire/wheel assembly constituted by fixing a tire, that is filled with compressed air, to a wheel. The apparatus includes a tire pressure sensor which directly detects an air pressure in the tire as a tire pressure and which outputs a tire pressure signal indicative of the detected tire pressure; and a determining device which determines whether there is a deformation state abnormality, that is an abnormality regarding a deformation state of the tire, in the tire/wheel assembly, based on frequency characteristics of the output tire pressure signal. Therefore, it is possible to accurately determine whether there is an abnormality in the tire/wheel assembly in the vehicle, regardless of fluctuation of a wheel speed.

18 Claims, 9 Drawing Sheets

TIRE/WHEEL ASSEMBLY ABNORMALITY DETERMINING APPARATUS AND METHOD

The disclosure of Japanese Patent Application No. 2003-146208 filed on May 23, 2003 including the specification, drawings and abstract is incorporated herein by reference in its entirety.

BACKGROUND OF THE INVENTION

1. Field of the Invention

The invention relates to a technology for determining whether there is an abnormality in a tire/wheel assembly in a vehicle. More particularly, the invention relates to a technology for enhancing accuracy of the determination.

2. Description of the Related Art

There is a known technology for detecting a state of a tire/wheel assembly in a vehicle provided with the tire/wheel assembly which is constituted by fixing a tire, that is filled with compressed air, to a wheel, while the vehicle is running (for example, Japanese Patent Laid-Open Publication No. 08-132831).

More particularly, Japanese Patent Laid-Open Publication No. 08-132831 discloses a technology for extracting a uniformity component of the tire based on a wheel speed signal indicative of a wheel speed, which is a rotational speed of the tire/wheel assembly, and for detecting a state of the tire/wheel assembly, including a standing wave of the tire, and wear of the tire, based on the extracted component.

According to the technology disclosed in Japanese Patent Laid-Open Publication No. 08-132831, the state of the tire/wheel assembly is detected with reference to the wheel speed signal. However, for example, a state of an air pressure in the tire, as an example of the state of the tire/wheel assembly, is attempted to be detected, the accuracy of detection of the air pressure in the tire may deteriorate when the wheel speed fluctuates, for example, when the vehicle accelerates/decelerates, or when the vehicle is running on a rough road. This is because a component which does not accurately reflect the air pressure in the tire, that is, noise (disturbance) for the air pressure detection, is easily mixed in the wheel speed signal.

SUMMARY OF THE INVENTION

The invention is made in the light of the above-mentioned circumstances. According to an aspect of the invention, there is provided a tire/wheel assembly abnormality determining apparatus which determines whether there is an abnormality in a tire/wheel assembly in a vehicle provided with the wheel constituted by fixing a tire, that is filled with compressed air, to a wheel. The tire/wheel assembly abnormality determining apparatus includes a tire pressure sensor which directly detects an air pressure in the tire as a tire pressure and which outputs a tire pressure signal indicative of the detected tire pressure, and a determining device which determines whether there is a deformation state abnormality, that is an abnormality regarding a deformation state of the tire, in the tire/wheel assembly, based on frequency characteristics of the output tire pressure signal.

According to another aspect of the invention, there is provided a tire/wheel assembly abnormality determining method for determining whether there is an abnormality in a tire/wheel assembly in a vehicle provided with the tire/wheel assembly constituted by fixing a tire, that is filled with compressed air, to a wheel. The determining method includes the following steps of: directly detecting an air pressure in the tire as a tire pressure and outputting a tire pressure signal indicative of the detected tire pressure; and determining whether there is a deformation state abnormality, that is an abnormality regarding a deformation state of the tire, in the tire/wheel assembly, based on frequency characteristics of the output tire pressure signal.

With the above-mentioned tire/wheel assembly abnormality determining apparatus and method, the air pressure in the tire is directly detected as the tire pressure. Accordingly, regardless of whether a special process is performed on the detected value with reference to the wheel speed, which is a rotational speed of the wheel, at least the detected value itself is obtained without reference to the wheel speed.

Further, based on the frequency characteristics of the tire pressure signal indicative of the detected tire pressure, it is determined whether there is an abnormality in the tire/wheel assembly, regarding the deformation state of the tire.

Therefore, it becomes easier to accurately obtain the frequency characteristics of the tire pressure signal indicative of the tire pressure regardless of fluctuation in the speed.

In addition, it is determined whether there is an abnormality in the tire/wheel assembly, regarding the deformation state of the tire, based on such highly accurate frequency characteristics. Therefore, it becomes easier to obtain the accuracy of the determination regardless of fluctuation in the wheel speed.

BRIEF DESCRIPTION OF THE DRAWINGS

The above-mentioned and other objects, features, advantages, technical and industrial significance of this invention will be better understood by reading the following detailed description of exemplary embodiments of the invention, when considered in connection with the accompanying drawings, in which.

DETAILED DESCRIPTION OF THE EXEMPLARY EMBODIMENTS

In the following description and the accompanying drawings, the present invention will be described in more detail with reference to exemplary embodiments.

Figure 1:
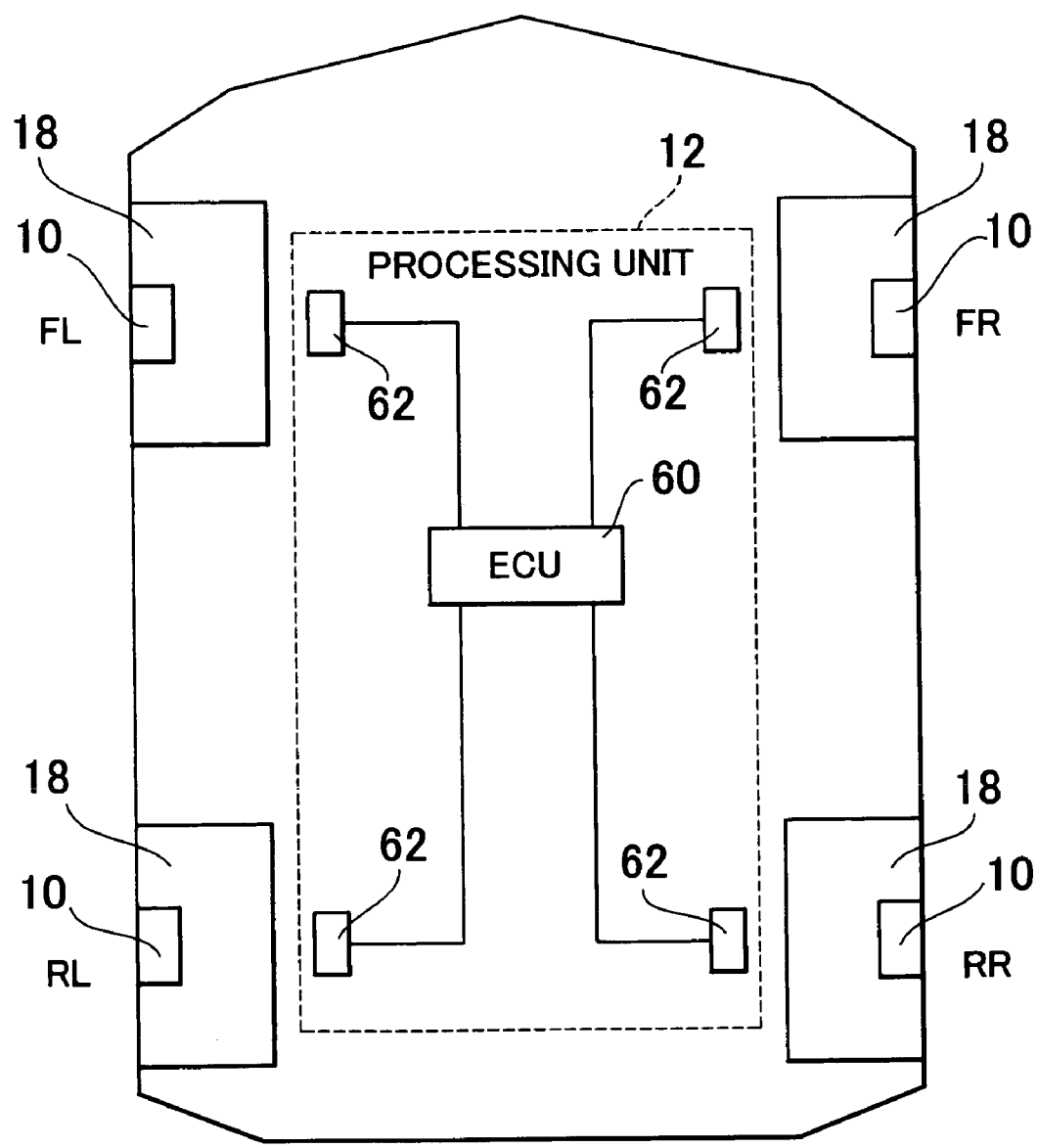
FIG. 1 is a plan view showing a tire/wheel assembly abnormality determining apparatus according to an exemplary embodiment of the invention.

FIG. 1 is a plan view showing a tire/wheel assembly abnormality determining apparatus (hereinafter, simply referred to as a "determining apparatus") according to an embodiment of the invention. The determining apparatus is mounted on a vehicle in which right and left front tire/wheel assemblies FR and FL and right and left rear tire/wheel assemblies RR and RL are supported by a vehicle body. The determining apparatus is configured so as to detect generation of a standing wave phenomenon and an abnormal decrease in an air pressure, as an abnormality related to a tire for each tire/wheel assembly.

The determining apparatus includes four detection units 10 which are provided in four tire/wheel assemblies 18 respectively in order to detect an air pressure in the tire, and a processing unit 12 which is provided in a vehicle body.

The determining apparatus is provided so as to remotely monitor a tire pressure of each of the four tire/wheel assemblies 18, by performing two-way communication between the four detection units 10 and the processing unit 12 by air.

Figure 2:
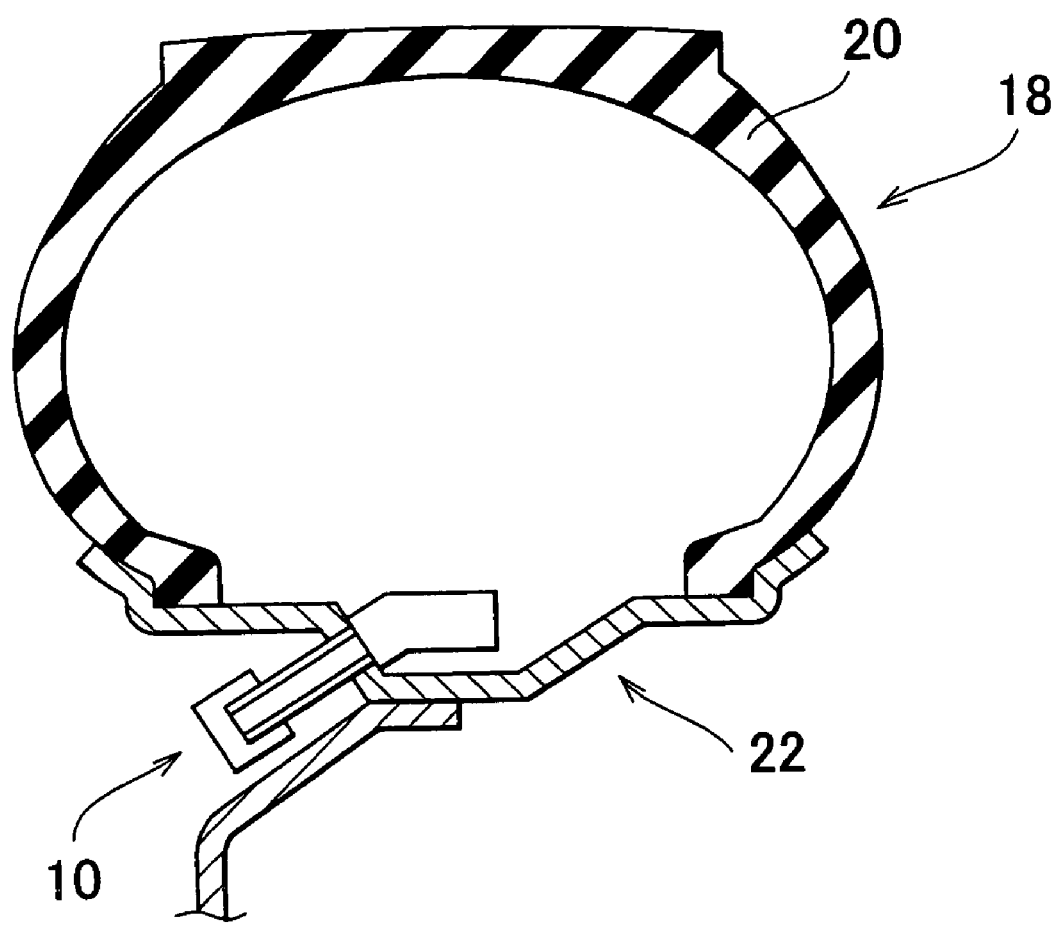
FIG. 2 is a sectional view showing a part of a tire/wheel assembly in FIG. 1.

As shown in FIG. 2, each tire/wheel assembly 18 is constituted by fixing a tire 20 to a wheel 22. The tire 20 is filled with compressed air. In the embodiment, the detection unit 10 is attached to the wheel 22. The detection unit 10 is constituted by housing after-mentioned plurality of components in one same housing.

Figure 3:
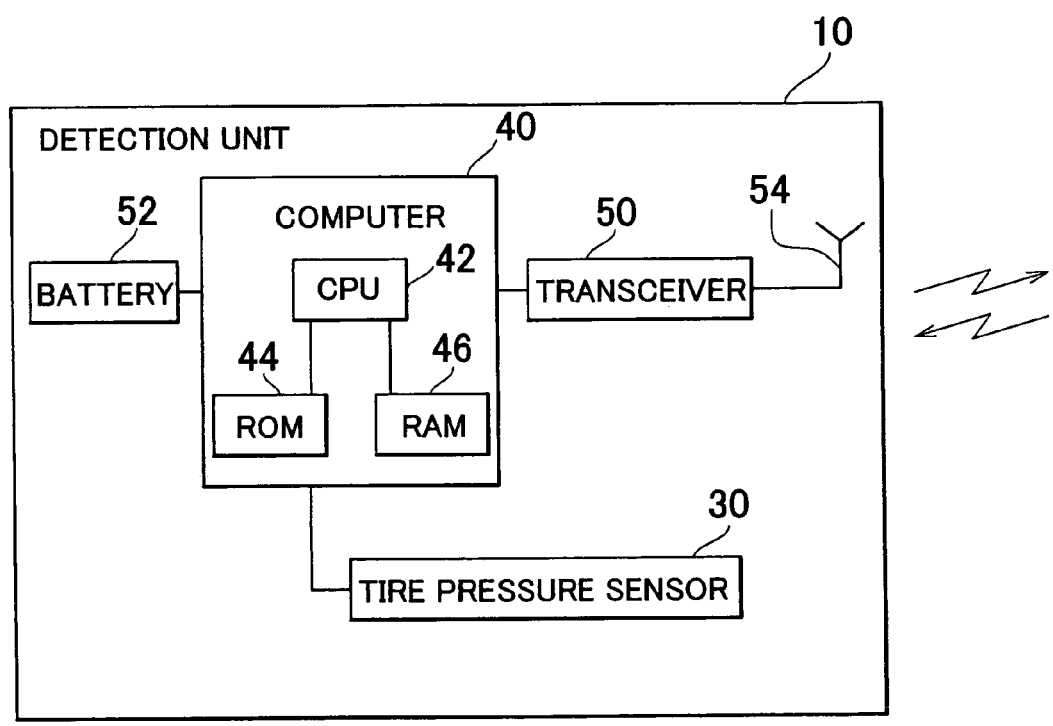
FIG. 3 is a block diagram showing a configuration of hardware of a detection unit in FIG. 1.

FIG. 3 is a block diagram showing a configuration of hardware of the detection unit 10. The detection unit 10 directly detects the air pressure in the tire 20 without reference to the wheel speed, and includes a tire pressure sensor 30 which outputs a tire pressure signal indicative of the detected value.

As shown in FIG. 3, the detection unit 10 further includes a computer 40. As is well known, the computer 40 is configured so as to include a CPU 42, ROM 44 and RAM 46. The tire pressure sensor 30, a transceiver 50 and a battery (an example of a power supply) 52 are connected to the computer 40. The transceiver 50 transmits/receives a signal (an electric wave) to/from the outside via an antenna 54. The battery 52 is an exchange battery, which is not charged when being exhausted.

As shown in FIG. 1, the processing unit 12 includes an electronic control unit (hereinafter, referred to as an "ECU") 60, and four antennas 62 each of which is provided near the antenna 54 for the detection unit 10 for each tire/wheel assembly 18.

A tire pressure detecting program (not shown) is stored in the ROM 44 in advance. When the tire pressure detecting program is performed by the CPU 42, for a corresponding tire/wheel assembly, a tire pressure P is detected by the tire pressure sensor 30, and a tire pressure signal indicative of the detected tire pressure P is transmitted from the antenna 54.

Figure 4:
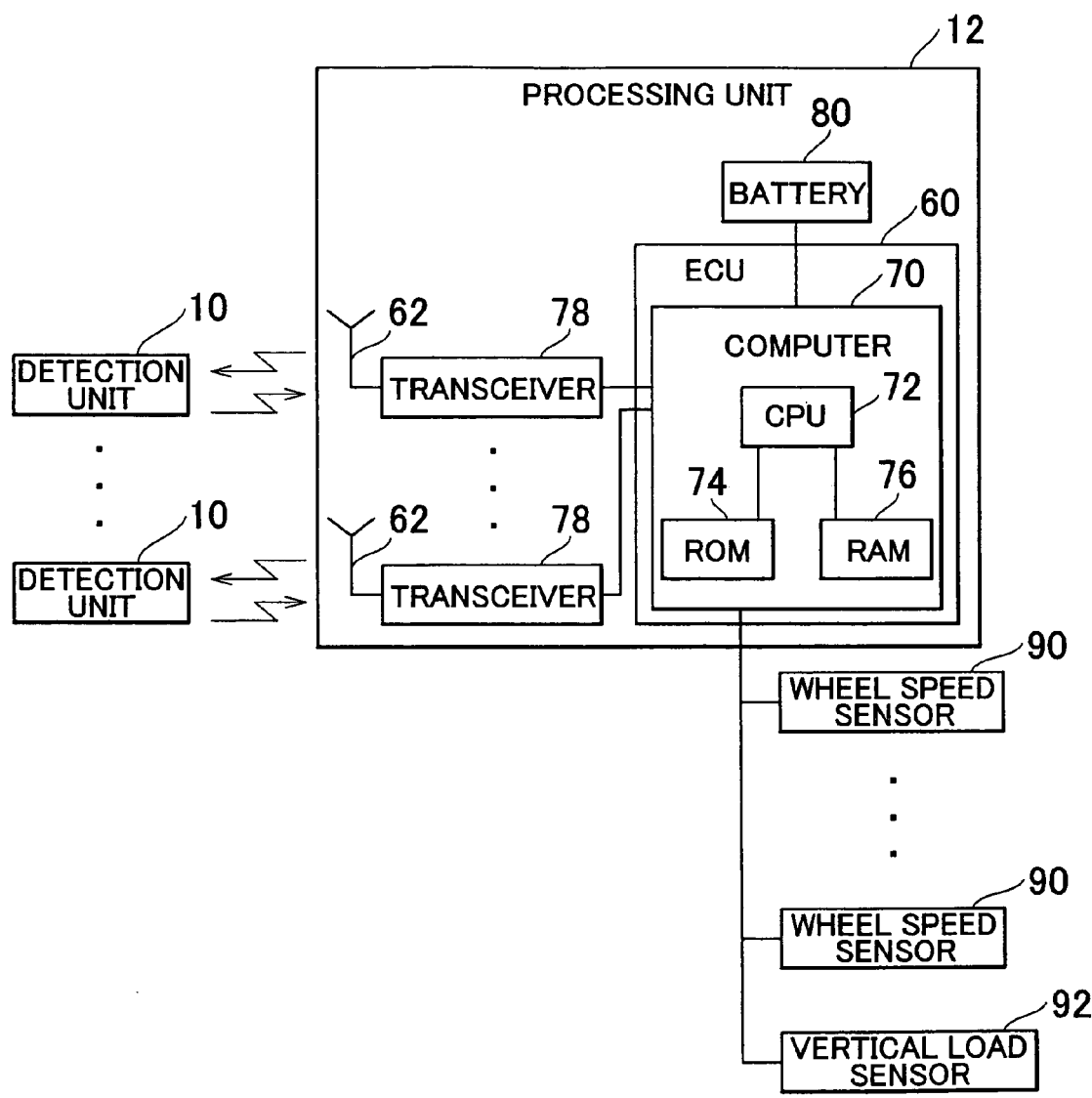
FIG. 4 is a block diagram showing a configuration of hardware of a processing unit in FIG. 1.

FIG. 4 is a block diagram showing a configuration of hardware of the processing unit 12. The ECU 60 in the processing unit 12 is configured so as to include a computer 70. As in the case of the computer 40 for the detection unit 10, the computer 70 is configured so as to include a CPU 72, ROM 74 and RAM 76. The processing unit 12 further includes four transceivers 78 which are connected to the four antennas 62 respectively, and the four transceivers 78 are connected to the ECU 60. A battery 80 is connected to the ECU 60. Unlike the battery 52 for the detection unit 10, the battery 80 is a rechargeable battery which is charged when being exhausted.

As shown in FIG. 4, four wheel speed sensors 90 provided in four tire/wheel assemblies 18 respectively are connected to the ECU 60. As is well known, each wheel speed sensor 90 is fixed to the vehicle body at a fixed position near a rotor that rotates in accordance with the corresponding tire/wheel assembly. The rotor has a plurality of teeth on a periphery thereof, such that the teeth are formed along the periphery which is coaxial with the tire/wheel assembly. The wheel speed sensor 90 is an electromagnetic pickup which electromagnetically detects passage of each tooth of the rotor. The wheel speed sensor 90 generates a voltage signal as a pulse which rises each time when each tooth of the rotor passes.

As shown in FIG. 4, a vertical load sensor 92 which detects a vertical load W of each tire/wheel assembly is further connected to the ECU 60. For each vertical load sensor 92, for example, a method for directly detecting the vertical load W, or a method for indirectly detecting the vertical load W based on a vertical stroke with respect to the vehicle body may be employed.

Figure 5A:
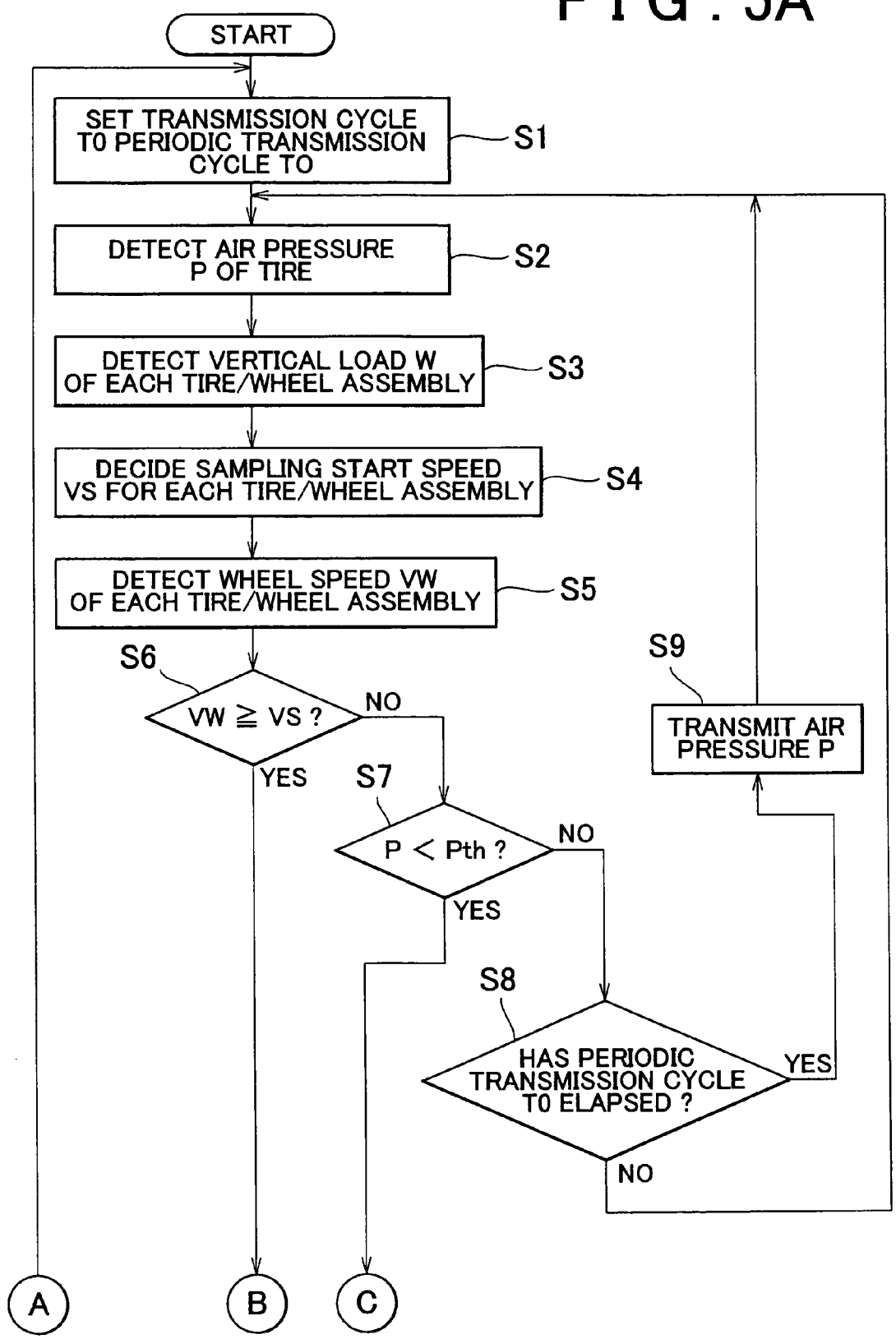
FIGS. 5A and 5B are a flowchart conceptually showing contents of a tire/wheel assembly abnormality determining program stored in ROM in FIG. 4.
Figure 5B:
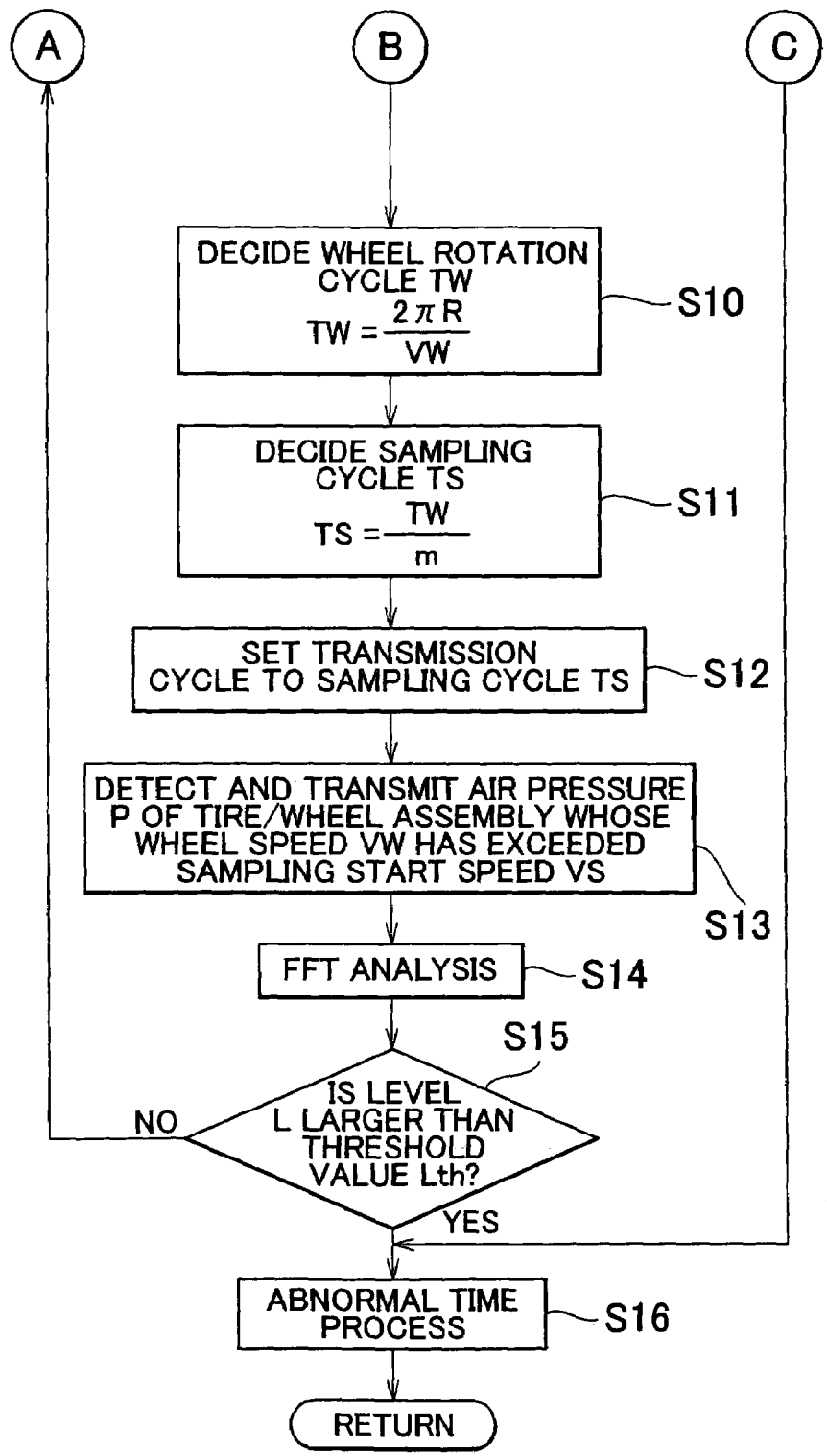

FIGS. 5A and 5B are a flowchart conceptually describing the contents of the tire/wheel assembly abnormality determining program which is stored in the ROM 74 of the computer 70 of the ECU 60 in advance. The tire/wheel assembly abnormality determining program is repeatedly performed by the CPU 72 for each tire/wheel assembly. When each routine of the tire/wheel assembly abnormality determining program is performed, initially, in step S1 (hereinafter, simply referred to as "S1"; the same is applied to the other steps), a transmission cycle, in which the detection unit 10 for each tire/wheel assembly transmits a signal to the processing unit 12, is set to a periodic transmission cycle T0 for periodically transmitting the signal. For example, the periodic transmission cycle T0 is set to a fixed value.

Figure 6:
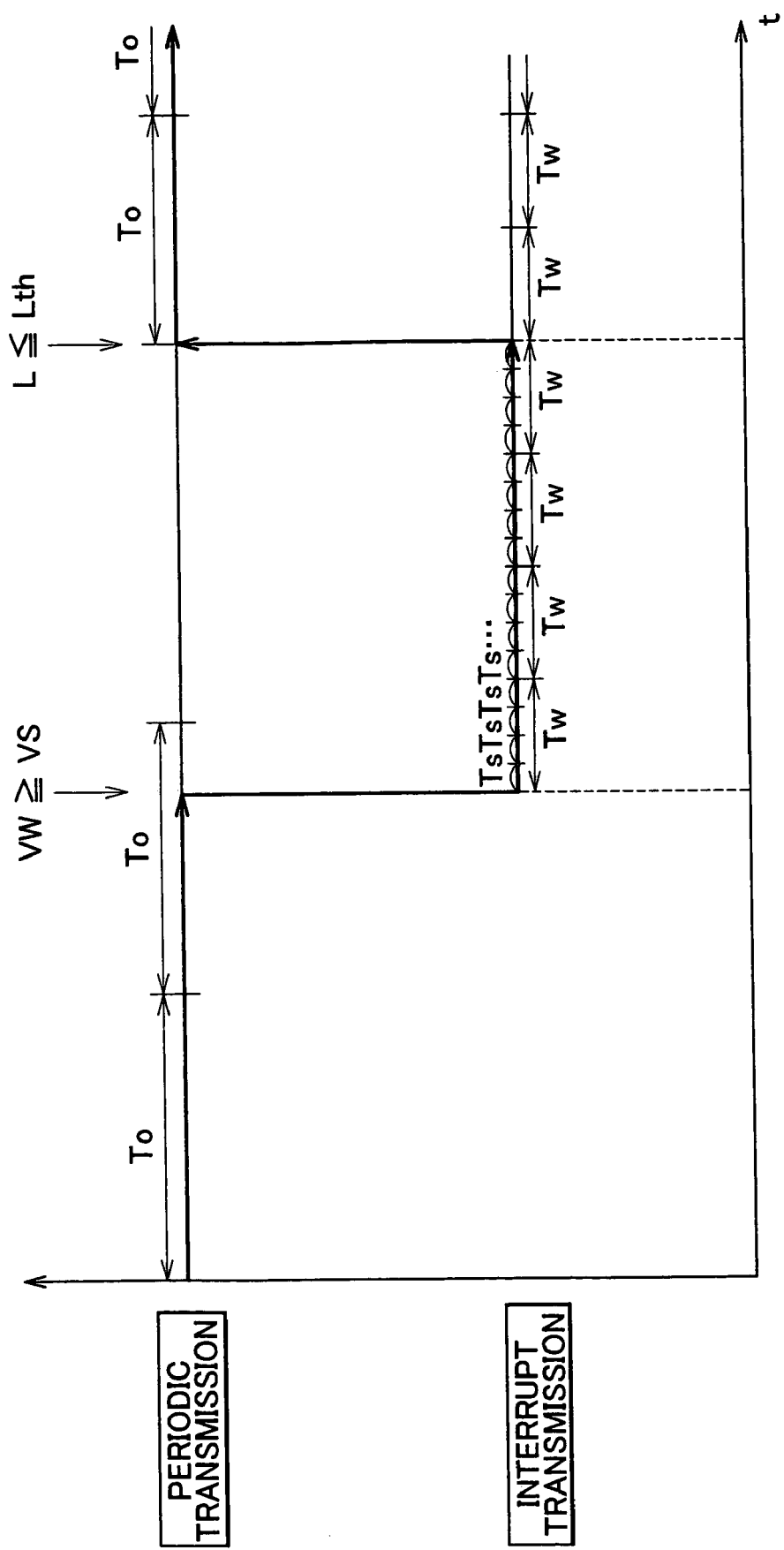
FIG. 6 is a time chart describing the tire/wheel assembly abnormality determining program in FIGS. 5A and 5B.

By setting the periodic transmission cycle T0, two-way communication between each detection unit 10 and the processing unit 12, that is, transmission of a transmission requirement signal from the processing unit 12 to each detection unit 10 and transmission of a tire pressure signal corresponding to the transmission requirement signal from each detection unit 10 to the processing unit 12, is repeatedly performed basically each periodic transmission cycle T0. FIG. 6 is a time chart showing the state of the periodic communication.

Next, in S2 in FIG. 5A, for each tire/wheel assembly, the signal received from the detection unit 10 is reconstructed to data, and the tire pressure P is detected based on the data. Next, in S3, for each tire/wheel assembly, the vertical load W is detected by the vertical load sensor 92.

Then, in S4, a sampling start speed VS is decided for each tire/wheel assembly. The sampling start vehicle VS is a speed which the wheel speed VW must exceed, in order to start a process for sampling the tire pressure P in a sampling cycle TS (refer to FIG. 6) which is shorter than the periodic communication cycle T0.

Figure 7:
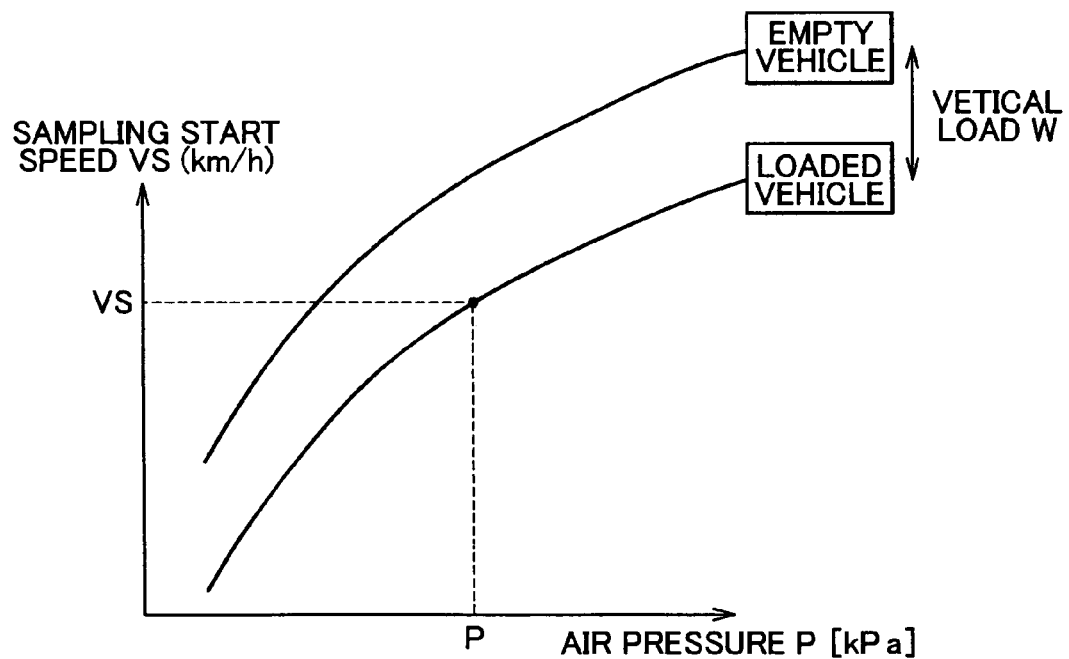
FIG. 7 is a graph describing a theory on which a sampling start speed VS is decided in the tire/wheel assembly abnormality determining program in FIGS. 5A and 5B.

In the embodiment, as shown in a graph in FIG. 7, a predetermined relationship, which is realized among the air pressure P, the sampling start speed VS and the vertical load W, is stored in the ROM 74 in advance. According to the relationship, the sampling start speed VS corresponding to both the detected value of the air pressure P and the detected value of the vertical load W is decided for each tire/wheel assembly.

Next, in S5, the vehicle speed VW of each tire/wheel assembly is detected by the wheel speed sensor 90. In the embodiment, the wheel speed VW is computed as a peripheral speed using an angular speed $\omega$ of the wheel, which is detected by the wheel speed sensor 90. More particularly, the wheel speed VW (peripheral speed) is computed, for example, as a product of the angular speed $\omega$ and a dynamic load radius R of the tire (which may be a standard value, or may be a variable value corresponding to the detected value of the air pressure P).

Then, in S6, it is determined whether the detected wheel speed VW is equal to or higher than the decided sampling start speed VS for each vehicle.

If the wheel speed VW is lower than the sampling start speed VS, a negative determination is made in S6. Then, in S7, it is determined whether the detected air pressure P is lower than a threshold value Pth.

If the air pressure P is equal to or higher than the threshold value Pth, a negative determination is made in S6. Then, in S8, it is determined whether the periodic transmission cycle T0 has elapsed (for example, whether the periodic transmission cycle T0 has elapsed since the newest transmission timing). If the periodic transmission cycle T0 has not elapsed, a negative determination is made in S8, and S2 is immediately performed again.

On the other hand, if the periodic transmission cycle T0 has elapsed, an affirmative determination is made in S8. Then, in S9, the air pressure P, which is detected in the newest S2, is transmitted to the processing unit 12. Then, S2 is performed again.

By repeatedly performing S2 to S9, the periodic transmission is repeatedly performed in the periodic transmission cycle TO, as shown in FIG. 6.

So far, the case where the air pressure P is equal to or higher than the threshold value Pth has been described. However, if the air pressure P is lower than the threshold value Pth, an affirmative determination is made in S7. Then, in S16, the process for the case where there is an abnormality in the tire/wheel assembly is performed as an abnormal time process. The abnormal time process is configured so as to include a process for warning a user of a vehicle that there is a tire/wheel assembly having an abnormality, a process for setting an upper limit of the running speed of the vehicle and for automatically limiting an actual value of the running speed of the vehicle such that the running speed does not exceed the set upper limit.

Thus, one routine of the tire/wheel assembly abnormality determining program is completed.

So far, the case where the wheel speed VW is lower than the sampling start speed VS has been described. When the wheel speed VW is equal to or higher than the sampling start speed VS, an affirmative determination is made in S6, and S10 is then performed.

In S10, for each tire/wheel assembly, the time necessary for the wheel to rotate one time is set to the wheel rotation cycle TW, by using the dynamic load radius R (which may be a standard value or may be a variable value corresponding to the detected value of the air pressure P), and the wheel speed VW. The wheel rotation cycle TW is decided using, for example, the following equation.

$$TW = 2\pi R/VW$$

FIG. 6 is a time chart showing a relationship between the wheel rotation cycle TW and the periodic transmission cycle T0.

Then, in S11, the sampling cycle TS is decided. More particularly, the sampling cycle TS is decided by dividing the decided wheel rotation cycle TW by the required number of times "m" of sampling the air pressure P during one rotation of the tire/wheel assembly. In the example shown in FIG. 6, the number "m" is set to "4".

Next, in S12, the transmission cycle for transmitting the air pressure P to the processing unit 12 is set to the decided sampling cycle TS.

Then, in S13, among the plural tire/wheel assemblies, the air pressure P is detected by the detection unit 10 and transmitted, for each tire/wheel assembly whose wheel speed VW has exceeded the sampling start speed VS, and also, as shown in FIG. 6, in each sampling cycle TS. As a result, the tire pressure signal indicative of the detected value is received by the processing unit 12. The transmission performed in S13 is called an "interrupt transmission", in order to distinguish this transmission from the periodic transmission.

In S13, as shown in FIG. 6, the sampling of the air pressure P is performed in the sampling cycle TS during one rotation of the tire/wheel assembly. Namely, the sampling of the air pressure P is performed at a predetermined number of times (4 times in FIG. 6) regardless of the wheel speed VW.

For an after-mentioned FFT analysis (Fast Fourier Transform Analysis) for the tire pressure signal, theoretically, a series of sampling of the air pressure P in each sampling cycle TS is sufficient, when being performed during one rotation of the tire/wheel assembly. However, in order to enhance reliability of the FFT analysis, it is desirable to perform the series of the sampling during several rotations of the tire/wheel assembly. Then, in the example in FIG. 6, the series of sampling is performed during four rotations of the tire/wheel assembly.

Next, in S14, the FFT analysis is performed for the tire pressure signal indicative of the result of the sampling. In the embodiment, among the tire pressure signals, several positions having the same frequency as predetermined multiples of a certain fixed number of the wheel rotation frequency are noted. Thus, the level (signal strength) L at each position is computed. The relationship between the frequencies and the levels L shows the frequency characteristics of the tire pressure signal.

Figure 8:
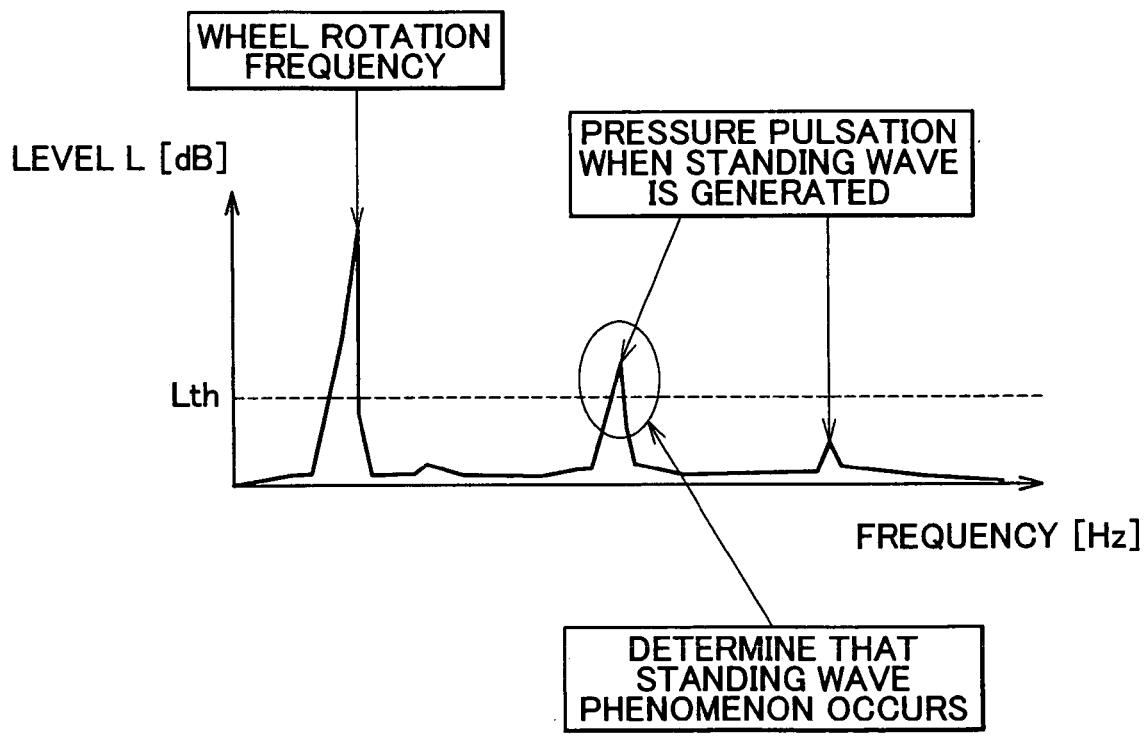
FIG. 8 is a graph describing a theory on which a determination is made that a standing wave phenomenon has occurred in a tire, in the tire/wheel assembly abnormality determining program in FIGS. 5A and 5B.

In FIG. 8, an example of the result of the FFT analysis is shown by a wavy graph in a coordinate plane using the frequency as a horizontal axis and the level L as the vertical axis. The wavy graph has a plurality of tops. Among the tops, the top having the lowest frequency appears at a position having the same frequency as the wheel rotation frequency (which is shown as an inverse number of the wheel rotation cycle TW). For example, as shown in FIG. 2, the wheel rotation frequency appears at this position due to the fact that the detection unit 10 is provided at one position in the peripheral direction of the tire.

The top having a higher frequency than that of the above-mentioned top appears at the position having the same frequency as each frequency of periodic fluctuation (pressure pulsation) generated in the air pressure P of the tire, in accordance with the generation of the standing wave phenomenon in the tire.

Then, in S15, among the plurality of tops, several tops which appear at the positions having the same frequency as multiples of the certain fixed number of the wheel rotation frequency are noted. In the example in FIG. 8, the two tops on the right side are noted. In addition, in S15, for each top, it is determined whether the level L has exceeded the threshold value Lth.

If there is a top whose level L has exceeded the threshold value Lth among the several tops, an affirmative determination is made in S15. In S16, the above-mentioned abnormal time process is then performed. Thus, one routine of the tire/wheel assembly abnormality determining program is completed.

On the other hand, if there is no top whose level L has exceeded the threshold value Lth among the several tops, a negative determination is made in S15, and S1 is performed again. In the embodiment, when a condition where the level L exceeds the threshold value Lth is satisfied even one time, a possibility that the transmission is returned from the interrupt transmission to the periodic transmission is immediately raised. However, a stand-by state may be continued until the condition is satisfied multiple times, and then the possibility that the transmission is returned from the interrupt transmission to the periodic transmission may be raised.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A tire/wheel assembly abnormality determining apparatus which determines whether there is an abnormality in a tire/wheel assembly in a vehicle provided with the tire/wheel assembly constituted by fixing a tire, that is filled with compressed air, to a wheel, comprising:
    a tire pressure sensor which directly detects an air pressure in the tire as a tire pressure and which outputs a tire pressure signal indicative of the detected tire pressure; and
    a determining device which determines whether there is a deformation state abnormality, that is an abnormality regarding a deformation state of the tire, in the tire/wheel assembly, based on frequency characteristics of the output tire pressure signal.

2. The tire/wheel assembly abnormality determining apparatus according to claim 1, wherein the determining device determines that there is the deformation state abnormality, when a standing wave phenomenon occurs in the tire.

3. The tire/wheel assembly abnormality determining apparatus according to claim 1, wherein the determining device decides the frequency characteristics based on the tire pressure signal which is obtained when the tire pressure sensor samples the air pressure multiple times during at least one rotation of the tire/wheel assembly, and decides a cycle of sampling based on a wheel speed related amount which is related to a wheel speed.

4. The tire/wheel assembly abnormality determining apparatus according to claim 1, wherein the determining device further determines whether there is a possibility that the deformation state abnormality will occur based on a wheel speed related amount which is related to a wheel speed, and permits performance of the deformation state abnormality determination when an affirmative determination is made.

5. The tire/wheel assembly abnormality determining apparatus according to claim 4, wherein the determining device permits performance of the deformation state abnormality determination based on a result of comparison between a detected value of the wheel speed related amount and a threshold value, and decides the threshold value based on at least one of the tire pressure and a vertical load of the tire/wheel assembly.

6. The tire/wheel assembly abnormality determining apparatus according to claim 1, wherein the determining device further determines whether there is an air pressure abnormality, which is an abnormality regarding the air pressure, in the tire/wheel assembly, based on the tire pressure detected by the tire pressure sensor.

7. The tire/wheel assembly abnormality determining apparatus according to claim 6, wherein the determining device performs the air pressure abnormality determination, when the deformation state abnormality determination is not performed.

8. The tire/wheel assembly abnormality determining apparatus according to claim 6, wherein the determining device repeatedly performs the air pressure abnormality determination using a predetermined time as a unit, and repeatedly performs the deformation state abnormality determination using one rotation of the tire/wheel assembly as a unit.

9. A tire/wheel assembly abnormality determining method for determining whether there is an abnormality in a tire/wheel assembly in a vehicle provided with the tire/wheel assembly constituted by fixing a tire, that is filled with compressed air, to a wheel, comprising the steps of:
    directly detecting an air pressure in the tire as a tire pressure, and outputting a tire pressure signal indicative of the detected tire pressure; and
    determining whether there is a deformation state abnormality, that is an abnormality regarding a deformation state of the tire, in the tire/wheel assembly, based on frequency characteristics of the output tire pressure signal.

10. The tire/wheel assembly abnormality determining method according to claim 9, further comprising the step of:
    determining that there is the deformation state abnormality, when a standing wave phenomenon occurs in the tire.

11. The tire/wheel assembly abnormality determining method according to claim 9, further comprising the steps of:
    deciding the frequency characteristics based on a tire pressure signal which is obtained by sampling the tire pressure multiple times during at least one rotation of the tire/wheel assembly; and
    deciding a cycle of sampling based on a wheel speed related amount which is related to a wheel speed.

12. The tire/wheel assembly abnormality determining method according to claim 9, further comprising the steps of:
    determining whether there is a possibility that the deformation state abnormality will occur based on a wheel speed related amount which is related to a wheel speed; and
    permitting performance of the deformation state abnormality determination, when an affirmative determination is made.

13. The tire/wheel assembly abnormality determining method according to claim 12, further comprising the steps of:
    permitting performance of the deformation state abnormality determination based on a result of comparison between a detected value of the wheel speed related amount and a threshold value; and
    deciding the threshold value based on at least one of the tire pressure and a vertical load of the tire/wheel assembly.

14. The tire/wheel assembly abnormality determining method according to claim 9, further comprising the step of:
    determining whether there is an air pressure abnormality, which is an abnormality regarding the air pressure, in the tire/wheel assembly, based on the tire pressure detected by the tire pressure sensor.

15. The tire/wheel assembly abnormality determining method according to claim 14, wherein the air pressure abnormality determination is performed, when the deformation state abnormality determination is not performed.

16. The tire/wheel assembly abnormality determining method according to claim 14, wherein the air pressure abnormality determination is repeatedly performed using a predetermined time as a unit, and the deformation state abnormality determination is repeatedly performed using one rotation of the tire/wheel assembly as a unit.

17. The tire/wheel assembly abnormality determining apparatus according to claim 1, further comprising:
   a wheel rotation sensor which detects a rotation speed of the wheel, wherein when a frequency of multiples of the certain fixed number (e.g. integer) of the wheel rotation frequency exceeds a predetermined threshold value, the determining device determines that there is a deformation state abnormality.

18. The tire/wheel assembly abnormality determining method according to claim 9, further comprising the steps of:
   detecting a rotation speed of the wheel; and
   determining that there is a deformation state abnormality of the tire when a frequency of multiples of the certain fixed number (e.g. integer) of the wheel rotation frequency exceeds a predetermined threshold value.

* * * * *